US010715206B2

(12) United States Patent
Shaffer et al.

(10) Patent No.: US 10,715,206 B2
(45) Date of Patent: *Jul. 14, 2020

(54) SYNCHRONIZED CPDMA (CODE PHASE DIVISION MULTIPLE ACCESS)

(71) Applicant: HIGHER GROUND LLC, Palo Alto, CA (US)

(72) Inventors: Shmuel Shaffer, Palo Alto, CA (US); Bruce Leonard McKinley, South Riding, VA (US); Scott A. McDermott, Washington, DC (US)

(73) Assignee: HIGHER GROUND LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/253,626

(22) Filed: Jan. 22, 2019

(65) Prior Publication Data

US 2019/0173515 A1  Jun. 6, 2019

Related U.S. Application Data

(63) Continuation of application No. 15/683,995, filed on Aug. 23, 2017, now Pat. No. 10,218,408.

(51) Int. Cl.
| | | |
|---|---|---|
| *H04B 1/00* | (2006.01) | |
| *H04B 1/69* | (2011.01) | |
| *H04W 64/00* | (2009.01) | |
| *H04B 7/185* | (2006.01) | |
| *G01S 19/00* | (2010.01) | |
| *H04B 1/7075* | (2011.01) | |

(52) U.S. Cl.
CPC .............. *H04B 1/69* (2013.01); *G01S 19/00* (2013.01); *H04B 1/7075* (2013.01); *H04B 7/18513* (2013.01); *H04W 64/00* (2013.01); *H04B 2001/6904* (2013.01)

(58) Field of Classification Search
CPC .... H04B 1/69; H04B 1/7075; H04B 7/18513; H04B 2001/6904; G01S 19/00; H04W 64/00

See application file for complete search history.

(56) References Cited

U.S. PATENT DOCUMENTS

| | | | | |
|---|---|---|---|---|
| 6,075,987 A | * | 6/2000 | Camp, Jr. ............... | G01S 19/05 342/357.43 |
| 6,985,512 B1 | | 1/2006 | McDermott et al. | |
| 10,218,408 B1 | * | 2/2019 | Shaffer .................... | H04B 1/69 |
| 2009/0073951 A1 | * | 3/2009 | Matos ..................... | G01S 19/24 370/342 |
| 2009/0079622 A1 | * | 3/2009 | Seshadri ................ | G01C 21/00 342/357.42 |

OTHER PUBLICATIONS

U.S. Appl. No. 15/683,995, filed Aug. 23, 2017, Shaffer et al.
(Continued)

*Primary Examiner* — Dhaval V Patel
(74) *Attorney, Agent, or Firm* — Jason H. Vick; Sheridan Ross, PC

(57) ABSTRACT

A communications protocol in accordance with one exemplary embodiment uses information from GPS satellites to synchronize the phases of transmitters, and aligns the phase with a spreading code used to de-spread the received signals at, for example, a ground station.

16 Claims, 8 Drawing Sheets

(56) References Cited

OTHER PUBLICATIONS

Bruno, R. et al. "A Code Phase Division Multiple Access (CPDMA) Technique for VSAT Satellite Communications" NASA Technical Reports Server, Nov. 1, 1991.
Office Action for U.S. Appl. No. 15/683,995, dated Apr. 13, 2018.
Office Action for U.S. Appl. No. 15/683,995, dated Nov. 2, 2018.
Notice of Allowance for U.S. Appl. No. 15/683,995, dated Dec. 12, 2018.

* cited by examiner

SYNCHRONIZED CPDMA (CODE PHASE DIVISION MULTIPLE ACCESS)

CROSS REFERENCE TO RELATED APPLICATIONS

This application is a Continuation of U.S. patent application Ser. No. 15/683,995, filed Aug. 23, 2017, now U.S. Pat. No. 10,218,408, the entirety of which is incorporated herein by reference.

TECHNICAL FIELD

An exemplary aspect is directed toward communications systems. More specifically, an exemplary aspect is directed toward wireless communications systems and even more specifically to wireless networks and/or satellite communications. Even more particularly, an exemplary aspect is directed toward wireless networks and the use of GPS satellite information to at least synchronize the phase of transmitters.

BACKGROUND

U.S. Pat. No. 6,985,512, Asynchronous Spread-Spectrum Communications, by Scott A. McDermott, and Leif Eric Aamot, which is incorporated herein by reference in its entirety, describes a method wherein a receiver of spread spectrum can receive communications from multiple devices that use the same spreading code. Because the code-phase of the signals arriving from the various transmitters is not synchronized, and because the spreading code is orthogonal to itself at different phases, the receiver can discriminate and decode various overlapping messages. The system assumes that the code-phase of the various transmitters is asynchronous. In the case where the code phases of two (or more) different transmitters happen to be substantially identical, reception may fail which can cause the higher communication layers to invoke re-transmission.

A similar idea was described in an earlier NASA paper entitled "A Code Phase Division Multiple Access (CPDMA) Technique for VSAT Satellite," by Bruno, R., McOmber, R., and Weinberg, A, which is also incorporated herein by reference in its entirety. Bruno describes a reference concept and architecture for implementing a CPDMA bulk demodulator/converter. More importantly, the paper provides an upper bound for the number of independent transmitters that can be reliably decoded using CPDMA.

SUMMARY

Both references make use of the properties of the spread spectrum code. Specifically, two spreading codes that are phase shifted by at least one chip are orthogonal with respect to each other. Both references also describe systems with one receiver and multiple asynchronous transmitters. Because the transmitters are not synchronized with each other, one may assume that the phases of the spreading codes that they use are different. More precisely, one may assume that when the transmitted signals arrive at the receiver, the phases of their spreading codes are different.

Assuming the signals arriving from different transmitters are aligned on chip boundaries, the probability of two chips having the same code-phases to within one chip time can be calculated as 1/N, where N is the code length. The first spread code can start at any time (on a chip boundary). To enable reception by the receiver, the second code must start such that its code is received at a different chip boundary. Assuming a spread code with N chips, one can calculate the probability that two codes would overlap. There are N different starting times, but to be different, the phase of the second spreading code must be one of the remaining N−1 starting times. So the chance that two codes have different phase is (N−1)/N. That leaves N−2 phases open for a third spreading code.

To find the probability that both the second spreading code and the third spreading code will have different phase, one multiplies:

$$N/N * (N-1)/N * (N-2)/N = N(N-1)(N-2)/N^3 \quad \text{(Eq. 1)}$$

For example, using a code length of 2047, this probability is approximately 99.85%.

If one wants to know the probability that four transmitters communications will arrive and not conflict, an additional multiplication is performed:

$$N/N * (N-1)/N * (N-2)/N * (N-3)/N = N(N-1)(N-2)(N-3)/N^4 \quad \text{(Eq. 2)}$$

Arbitrarily using again the above code length example of 2047, this probability is approximately 99.7%.

One can continue with this basic formula for any number of transmitters. For a spreading code of N chips, the probability that n spreading codes have different phase is:

$$N/N * (N-1)/N * (N-2)/N * \ldots (N-n+1)/N = N(N-1)(N-2) \ldots (N-n+1)/N^n \quad \text{(Eq. 3)}$$

This formula can be rewritten as:

$$N!/((N-n)! * N^n) \quad \text{(Eq. 4)}$$

From Equation 4, one can see that the probability of n asynchronous transmitters not to have the same phase decreases as a function of n, the number of simultaneous asynchronous transmitters. For the example of a spreading code with 2047 chips, once there are more than 53 transmitters, the probability of any transmitter conflicting with another transmitter is greater than 50%.

The above calculation was done under the assumption that the spreading codes are aligned on the chip boundary. This assumption does not hold true however for asynchronous transmitters whose spreading code can start at any time (and not exactly on a chip boundary) as observed from the receiver. As explained above, spreading codes are orthogonal with respect to the same code which starts at a different phase (on chip boundary).

However, when two spreading code phases are separated by a fraction of a chip period at the receiver, the multiplication of the two codes may yield a number which is smaller than one but still greater than zero. Therefore, for practical reasons, to ensure reception of two different signals by a single receiver, Bruno's NASA paper suggests that the minimum phase offset for each received code phase is 1.5 chips.

Therefore, the probability of Equation (4) can be modified, yielding $$(N/1.5)!/(((N/1.5)-n)! * (N/1.5)^n) \quad \text{(Eq. 5)}$$

Using this equation and our example with length-2047 code, we find that using 43 asynchronous transmitters would result in a collision probability of about 50%, a reduction of (53−43)/53=19% in the number of simultaneous transmitters.

One method of increasing the number of simultaneous transmitters without increasing the probability of phase collision is to increase the length of the spreading code.

However, this would increase the complexity of the system and either require greater bandwidth or reduce the available data rate.

Another method would be to have all the transmitters synchronize their chip times such that they would all be received exactly on a chip boundary. This would not prevent collisions from arrivals at identical code-phase, but would ensue that the code phases are aligned to within a single chip time. It would thus avoid the penalty described by Eq. 5, which facilitates only 81% of the simultaneous transmitters in our example.

Given the fact that the many devices can communicate only via satellite link, the devices cannot synchronize their code-phase directly with each other. As will be explained below, synchronization with the satellite ground station is not feasible either.

For practical reasons the length of the spreading code that the satellite ground station uses for the forward path transmission is shorter than the spreading code used by the device to transmit over the return path by a factor of 100-200. This is done for two main reasons:

i) The return path is used by multiple devices which send messages to the ground station. As can be seen from Eq. 4, the longer the code the lower the probability that two devices use the same code-phase, and as such the lower the probability for collision that would necessitate retransmission. The spreading code used for the forward path is broadcast to any listening devices, and as such there is no risk of code-phase conflict.

ii) Receivers that can handle longer spreading code may be more expensive because they require greater bandwidth for the same data rate. Increasing the cost of a single ground station receiver may have low impact on the overall system financial viability, however, increasing the cost of the many devices that receive the forward path transmissions may be financially forbidding.

In addition to the forward path's spreading code being much shorter, each one of its chips has longer duration than the chips used for the return path. For a terminal/device (these terms are used interchangeably) to synchronize its timing with the ground station, the terminal would need to estimate the precise timing of the received signal on the forward path as well as the precise path length from the ground station through the satellite to the device itself. The only method available to estimate precise timing on the forward path is the forward path chip arrival time.

Since the timing of the spreading code (chips) of the return code is much shorter than that on the forward path, any small percentage error in the estimation of the timing of the forward spreading code would translate to a large (percentage wise) error in the timing of the return path spreading code which has much shorter chip timing. As a result, deriving the timing information from the spreading code of the forward path and using it to set or adjust the timing of the return path spreading code is not practical.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DESCRIPTION OF EMBODIMENTS

To at least address the above deficiencies, and in general to improve communications, a system in accordance with one exemplary embodiment uses information from GPS satellites to synchronize the phase of the transmitters, and align the phase with spreading code used to de-spread the received signals.

Figure 1:
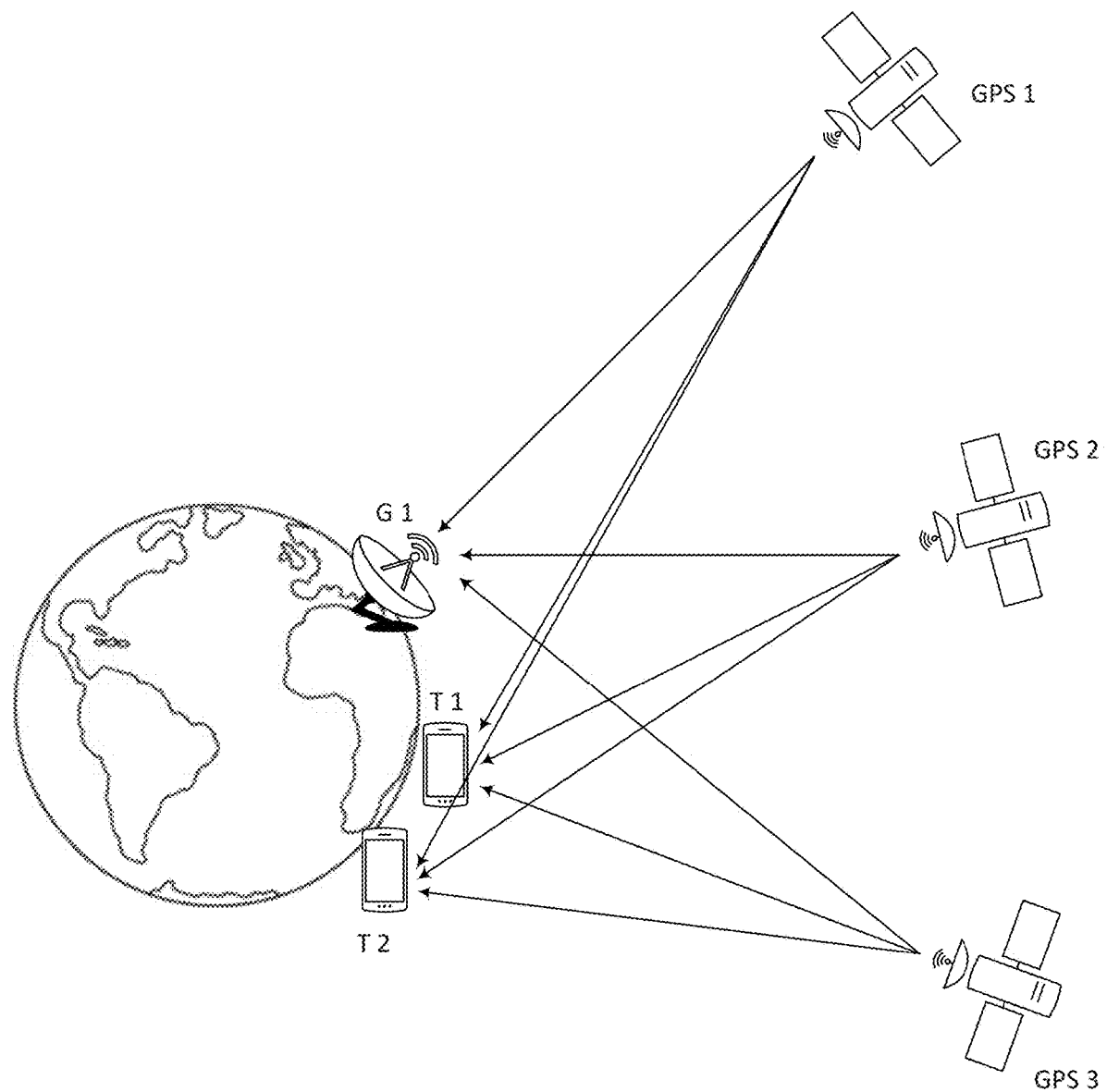
FIG. 1 illustrates an exemplary communications environment in accordance with some embodiments.

FIG. 1 illustrates an exemplary operational environment of the communications system. The environment includes any number of terminals or transceivers or communications devices (here T1 and T2), a number of GPS (Global Positioning System) satellites (GPS1-GPS3) (only three are illustrated) and one or more ground stations (G1) (only one is illustrated).

Figure 2:
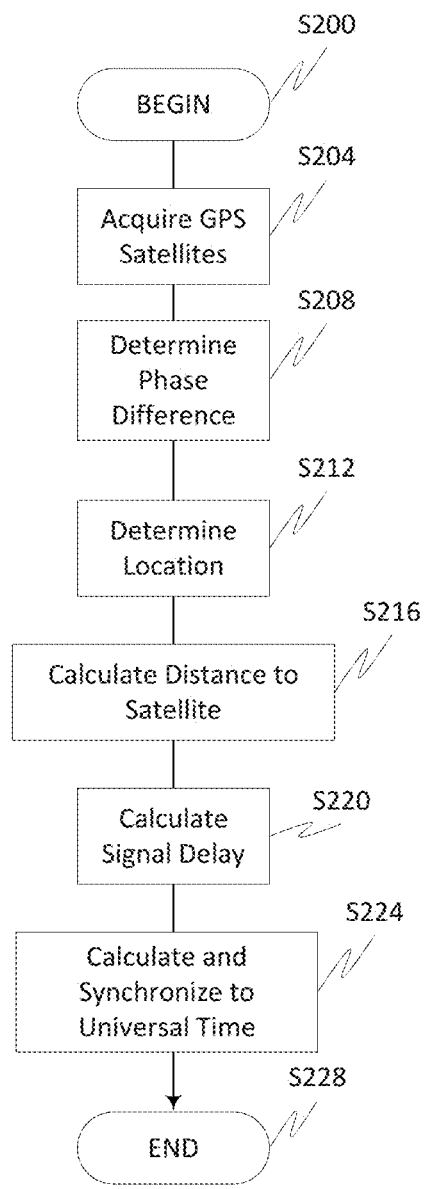
FIG. 2 illustrates an example of determining universal time in accordance with some embodiments.

The GPS receivers in the terminals T1 and T2 receive GPS signals from at least three GPS satellites GPS1, GPS2, and GPS3, and infer from the signals precise universal time. The process of obtaining the universal time is illustrated in FIG. 2.

Beginning in step S200, and continuing to step S204, each one of the terminals (T1, T2) acquires at least three GPS satellites (GPS1, GPS2, GPS3). Note that the satellites (GPS1, GPS2, GPS3) do not need to be the same for the terminals (T1, T2) and the terminals can acquire and use different or overlapping satellites. For example, terminal T2 may acquire GPS satellites GPS1, GPS3, and GPS4 (the last satellite is not shown in FIG. 1)

Next, in step S208 each terminal determines the phase difference between the GPS signals from the different GPS satellites that were acquired, and based on this difference, determines in step S212 the terminal's location. Then, in step S216, the terminal determines its distance from each one of the acquired GPS satellites. This distance is used in step S220 to calculate the travel time of the signal from each acquired GPS satellite to the terminal. Specifically, the terminal uses the speed of light to convert the distance to a time delay. This delay is then corrected for the ionospheric delay using a model provided in a navigation message, for the "Sagnac" effect (the result of transmission in a rotating inertial reference system), and for hardware delays in cables and receiver circuitry. The resulting delay time is used then in step S224 to align and synchronize the internal clock of the terminal with the universal time.

This alignment of the internal clock is accomplished by adjusting the received universal time from a satellite by the respective travel time of the signal from a GPS satellite. The universal time can be determined from any of the GPS satellites. In accordance with an optional embodiment, the terminal can perform steps S216-S224 with respect to multiple satellites and average the result so as to minimize any timing error that may exist in the timing obtained from any single satellite. This averaged result can then be used to update the internal clock.

The steps describe above help establish a common timing for all terminals; however, as explained below, this timing is not suitable for aligning the code-phase of the transmitted signals from each terminal.

Figure 3:
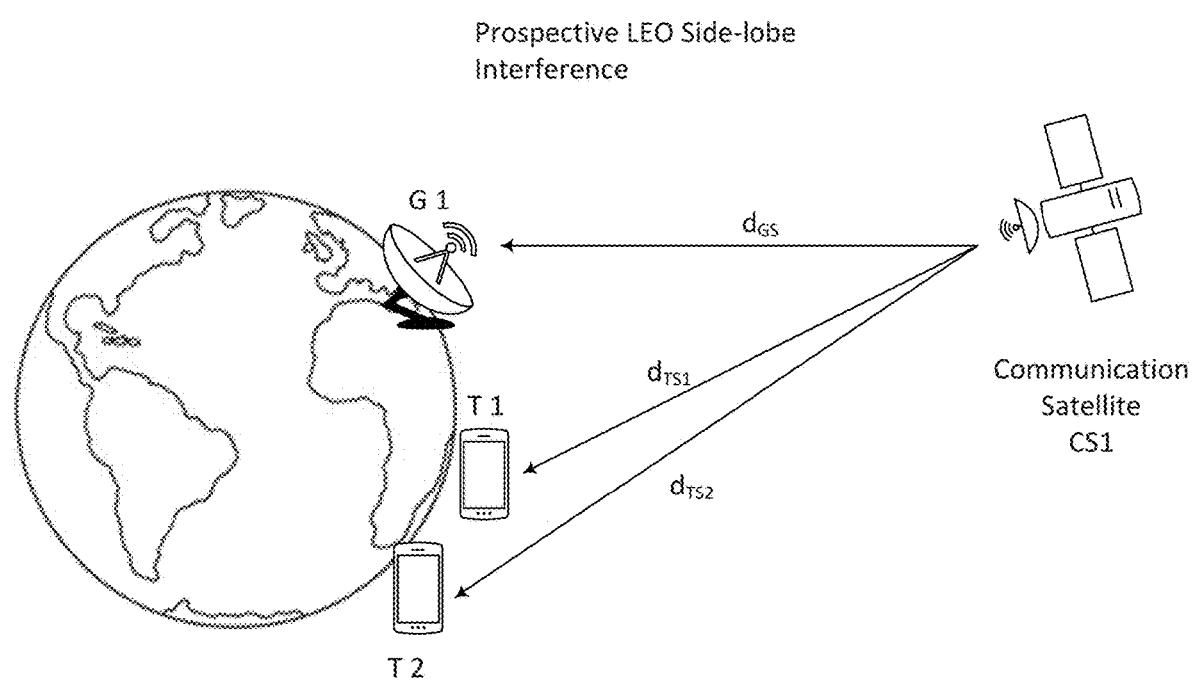
FIG. 3 illustrates exemplary interference in accordance with some embodiments.

In FIG. 3, communications satellite CS1 and ground station G1 are used to facilitate communications between terminals T1 and T2. The code-phase arriving at the ground station G1 from terminal T1 depends on the code-phase of the transmitted signal and the distance:

$$D_{T1}=d_{TS1}+d_{GS} \quad \text{(Eq. 6)}$$

Similarly, the code-phase of the signal arriving at the ground station from terminal T2 depends on the code-phase of the transmitted signal and the distance:

$$D_{T2}=d_{TS2}+d_{GS} \quad \text{(Eq. 7)}$$

The difference between the code-phases of these two signals is relative to the difference in their respective travel times and can be calculated by:

$$\Delta D=(d_{TS1}+d_{GS})-(d_{TS2}+d_{GS})=d_{TS1}-d_{TS2} \quad \text{(Eq. 8)}$$

The location of the communications satellite CS1 is known. For geostationary (GEO) satellites, the location in space relative to earth coordinates is fixed. For any other satellites (e.g., low-earth orbit (LEO) or non-stationary geosynchronous satellites), the precise location relative to the earth varies with time but can be determined at any time. Once the location of a terminal is determined via GPS, the distance between the communications satellite and the terminal can be calculated.

In accordance with one exemplary embodiment, the terminals are configured to align the code-phase of the arriving signals at the communications satellite to coincide with a specific moment in time that will be referred to as a "tick time." Since signals from different terminals, e.g., T1 and T2, travel the same distance from the communications satellite to the ground station, once the arriving code-phase of the signals is synchronized at the communications satellite, the code-phase of the signals would remain synchronized at the ground station as well. A detailed description of this exemplary process is provided in FIG. 4.

Figure 4:
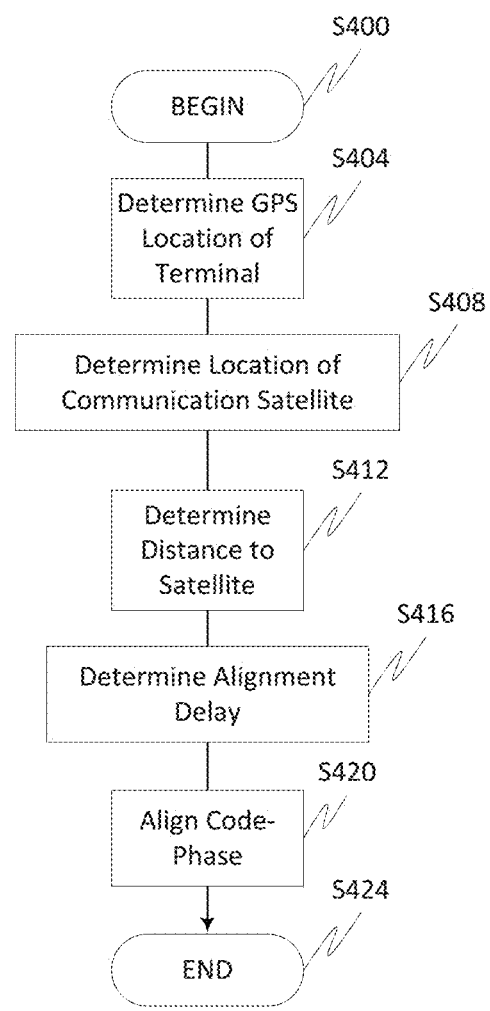
FIG. 4 illustrates an exemplary method for aligning code phase in accordance with some embodiments.

Referring to FIG. 4, the exemplary process commences in step S400 and continues to step S404. In step S404, the terminal determines its GPS location using satellites GPS1, GPS2, GPS3, optionally as well as other GPS satellites that the terminal can acquire. Next, in step S408, the terminal selects a communications satellite and determines the position of this satellite in space. Then, in step S412, the distance between the terminal and the communications satellite is calculated. Control then continues to step S416.

In step S416, the terminal determines the alignment delay to ensure that the code-phase of the received signal at the communications satellite CS1 is aligned with a specific timing tick (e.g., on a 100 ms boundary or other boundary). To achieve this, the travel time of the signal from the terminal to the communications satellite is calculated using the propagation speed of radio waves through the layers of the atmosphere. The time is divided modulo the boundary clock tick time, and the result is the alignment time. Specifically:

$$\text{Alignment time delay}=(\text{tick time})-(d_{TS}/c)\bmod(\text{tick time}), \quad \text{(Eq. 9)}$$

where:
$d_{TS}$ is the distance between the terminal and the communications satellite, and
c is the propagation speed of the radio wave.

In step S420, the code-phase used for the terminal transmission is aligned by delaying the start of a transmission by the alignment time delay of Eq. (9) with respect to the universal clock ticks.

By synchronizing the code phase of the arriving signals from the terminals at the communications satellite, the code phases of the arriving signals at the ground station receiver are also aligned on the chip boundary. As a result the chip times of the spreading codes are substantially aligned and the starting times of signals received from each transmitter will be offset by an integer multiple of chip time. As explained above, when this occurs, the maximum number of simultaneous transmitters can be estimated by Eq. (4) rather than by Eq. (5). In other words, the maximum number of simultaneous transmitters that can be reliably decoded is increased by about 20% (depending on the length of the spreading code.

In accordance with another exemplary aspect, the ground station follows a process similar to the one described in relation to FIG. 2, and synchronizes its internal timer with the universal time from the GPS satellites. This is done so that the code phase (timing) of any received message can only occur at integer multiples of chip time from a universal tick. In this way, the chip timing associated with signals received in the ground station from any terminal is implied instead of estimated at the receiver. This exemplary aspect allows the receiver to operate at a lower sample rate, and may even reduce the amount of operations required and/or even allow for demodulation of signals received at lower signal-to-noise ratios.

The terminals of this aspect should take into account the distance $d_{GS}$ between the communications satellite and the ground station. The process of adjusting the code-phase by each terminal is described in FIG. 5.

Figure 5:
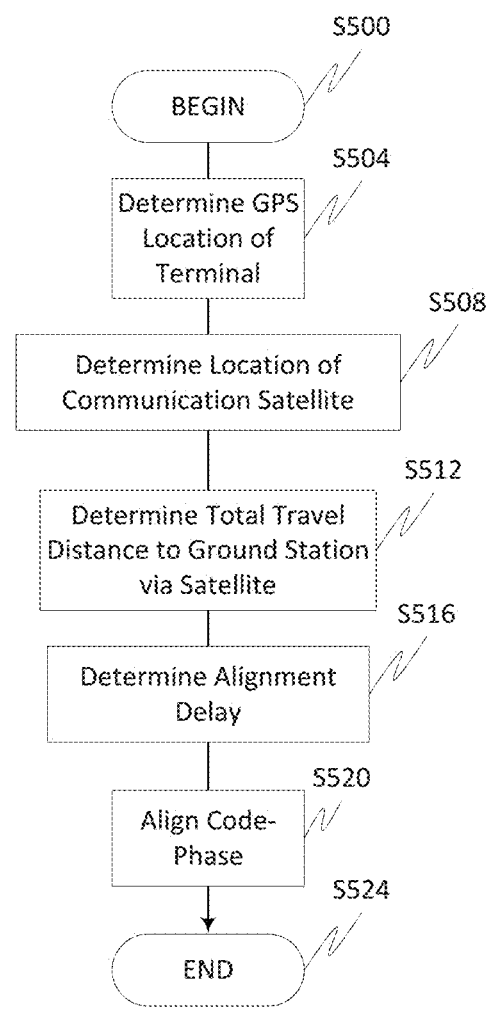
FIG. 5 illustrates an exemplary method for aligning code phase in accordance with some embodiments.

In FIG. 5, both the location of the terminal and the location of the ground station are determined. Then, based on these locations and the location of the communications satellite, the system can calculate the total distance the radio signal needs to travel. FIG. 3 describes how the system obtains the distance between the terminal and the communications satellite, while FIG. 5 focuses on the method to determine the distance between the ground station and the communications satellite and adding these two distances for the calculation in Eq. 10.

The process commences in step S500 and continues to step S504. In step S504, a terminal determines its GPS location using satellites GPS1, GPS2, GPS3, as well as one or more other GPS satellites that the ground station can acquire. Next, in step S508, the terminal selects a communications satellite and determines the position of this satellite in space and determines the position of this satellite in space. Then, in step S512, the distance between the terminal and the communications satellite is calculated. The system adds this distance to the distance between the communications satellite and the ground station and determines the total distance the radio signal from the terminal needs to travel towards the ground station. Cable and other receiver delays can optionally be factored in as well with control continuing to step S516.

In step S516, the terminal determines the alignment delay to ensure that the code-phase of the received signal at the ground station receiver G1 is aligned with a specific timing clock tick. To achieve this, the total travel time of the signal from the terminal to the ground station is calculated using the speed of propagation. The travel time is divided modulo the boundary clock tick time, and the result is the alignment time. Specifically:

$$\text{Alignment time delay} = (\text{tick time}) - ((d_{TS} + d_{GS})/c) \bmod (\text{tick time}), \quad \text{Eq. (10)}$$

where:
  $d_{TS}$ is the distance between the terminal and the communications satellite,
  $d_{GS}$ is the distance between the ground station and the communications satellite, and
  c is the propagation speed of the radio wave.

In step S520, the code-phase used for the terminal transmission is aligned by delaying the transmission spreading code by the alignment time delay of Eq. (10) with respect to the universal clock ticks. Note that this calculation can provide an initial estimate of the alignment time delay, which can be refined by moving toward the aggregate of actual arrival times of messages received. In this manner, the swapping of a cable in the ground station, for example, or perturbations of the satellite in its orbit, can be handled dynamically within the receiver without manual intervention.

Through the exemplary process outlined in FIG. 5, the code phases of the arriving signals at the ground station receiver are aligned on a chip boundary. Consequently, the maximum number of simultaneous transmitters that can be reliably decoded is increased by a factor of at least 1.5. In addition, since the receiver in the ground station receives signals for which the code-phase is substantially aligned on a chip phase, the ground station can align the phase of the spread code it uses for decoding the received signals in the proximity of the same boundary and as such increase the efficiency of the receiver.

Figure 6A:
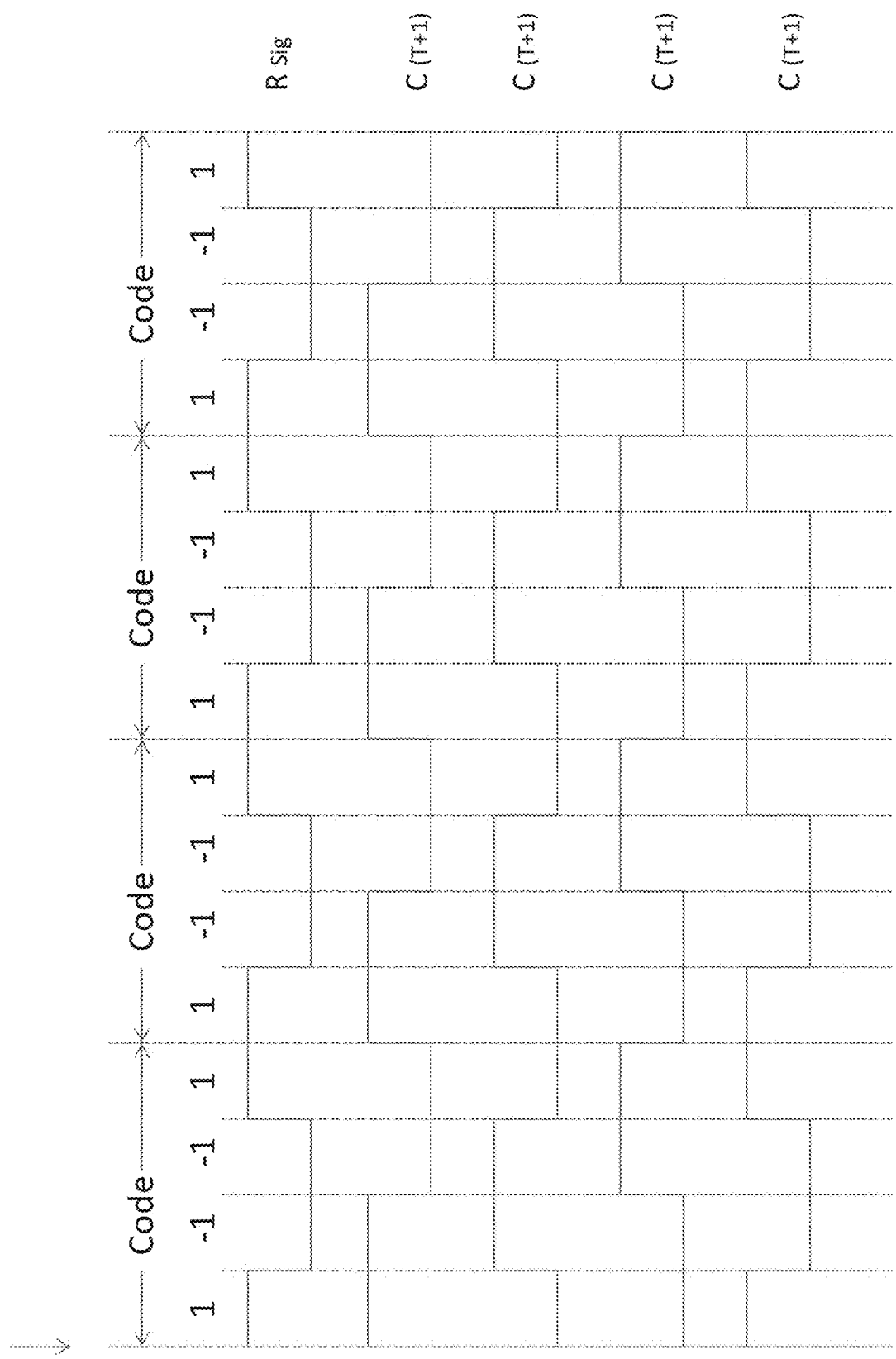
FIG. 6A illustrates an exemplary orthogonal spreading code of length 4 in accordance with some embodiments.
Figure 6B:
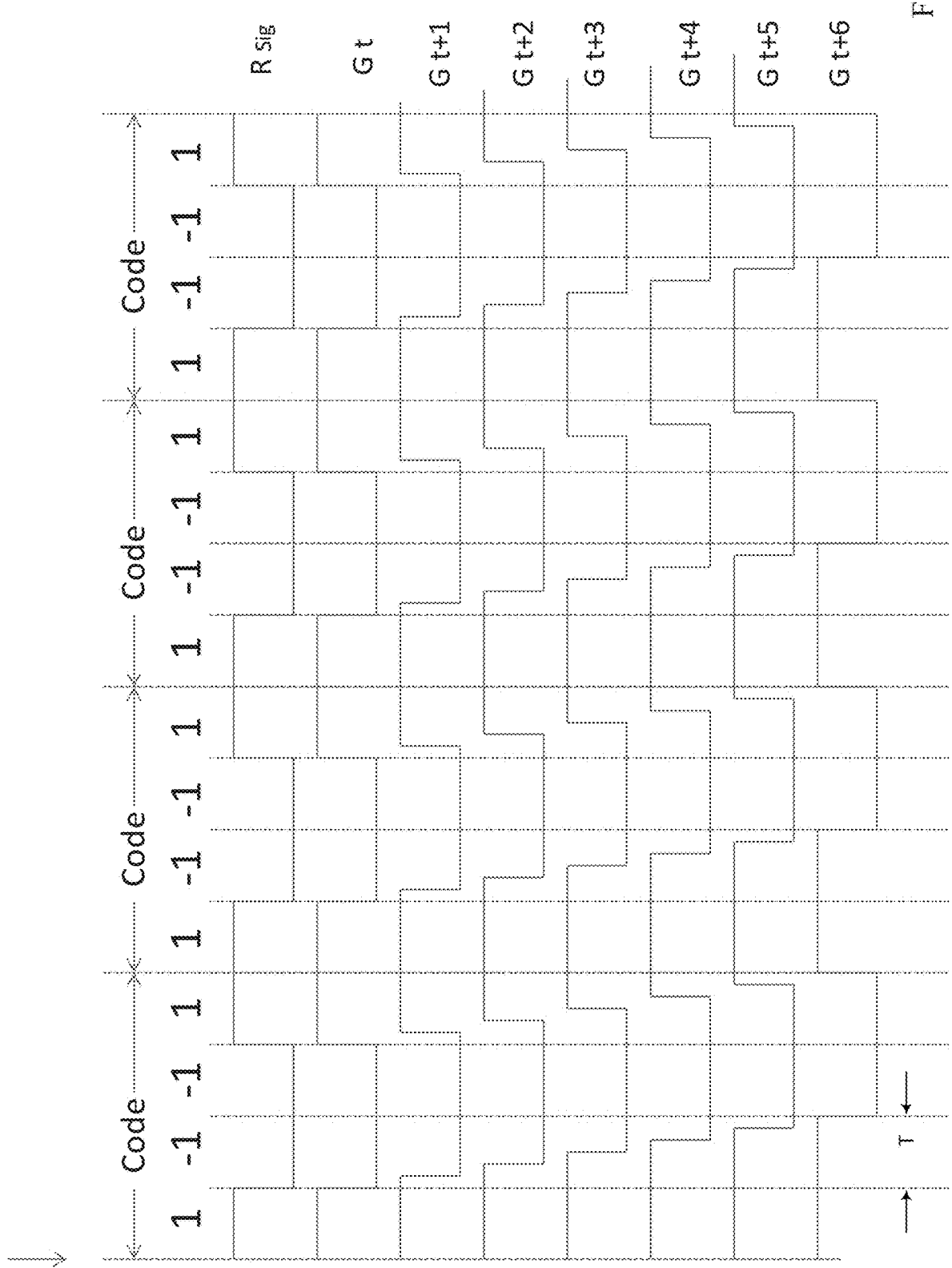
FIG. 6B illustrates an exemplary recovery of code phase of asynchronously transmitted signals in accordance with some embodiments.

FIGS. 6A and 6B illustrate in greater details exemplary computational savings that the second embodiment described above provides. FIG. 6A illustrates an exemplary orthogonal spreading code with four chips. The code can be described as:

$$S_T = \{1, -1, -1, 1\} \quad \text{Eq. (12)}$$

Multiplying the code by itself and normalizing it by its length results in:

$$(1*1 + (-1)*(-1) + (-1)*(-1) + 1*1)/4 = 1 \quad \text{Eq. (13)}$$

Shifting the code by integer chip times results in:

$$S_{(T+1)} = \{1, 1, -1, -1\} \quad \text{Eq. (14)}$$

$$S_{(T+2)} = \{-1, 1, 1, -1\} \quad \text{Eq. (15)}$$

and $$S_{(T+3)} = \{-1, -1, 1, 1\} \quad \text{Eq. (16)}$$

Multiplying the signal $S_T$ of Eq. 12 by the shifted signal $S_{(T+1)}$ of Eq. 14 results in $$(1*1 + (-1)*1 + (-1)*(-1) + 1*(-1))/4 = 0 \quad \text{Eq. (17)}$$

Similarly, multiplying $S_T$ by $S_{(T+2)}$ or by $S_{(T+3)}$ yields 0. Thus the signal $S_T$ is orthogonal with respect to itself.

The above discussion of the despreading operation is simplified by the fact that the symbol streams spread by the code $S_T$ as shown in FIG. 6A all have the same value (+) and there are no symbol transitions from + to −, − to −, or − to +. Those skilled in the art should recognize that actual systems will incorporate such symbol values which are variable, and thus symbol transitions will occur. As such, the correlations as the code is applied will take on values between −1 and 1, with maxima occurring at symbol start points. Also, the chips are shown in FIG. 6A as rectangular functions with no chip pulse shaping. Actual systems will may likely incorporate chip pulse shaping, which will result in further variations to the correlation output values.

When a ground station received a communications signal from a terminal (such as terminal T1 or T2 of FIG. 1), relayed via a communications satellite (such as satellite CS1 of FIG. 3), the specific phase of the spreading code needs to be recovered.

Referring to FIG. 6B, a signal $R_{Sig}$ is received at the ground station. As it is well known in the art, existing spread spectrum receivers generate n signals $G_t$ through $G_{t+(n-1)}$ shifted by fraction of the spreading code chip time T. These signals are denoted in FIG. 6B as $G_t$, $G_{(t+1)}$, $G_{(t+2)}$, etc.

To recover the specific timing T of the spreading codes chips, the receiver in the ground station multiplies the received signal $R_{Sig}$ by each one internally generated signals $G_t$, $G_{(t+1)}$, $G_{(t+2)}$, etc., and normalizes the result by the length of the spreading code in a process similar to the one described by Eq. 13.

Normalized multiplying $R_{Sig}$ by $G_t$ yields 1. Similarly, multiplying $R_{Sig}$ by $G_{t+6}$ yields 0. Multiplying $R_{Sig}$ by $G_{t+i}$ where i is an integer other than 0 or 6 yields a fraction smaller than 1. Existing receivers may recover the chip time by identifying the integer i that results in the largest normalized multiplication of the received signal by the internally generated signals.

The process of generating the sequence of signals $G_t$, $G_{(t+1)}$, $G_{(t+2)}$, etc., and multiplying the received signal $R_{Sig}$ by each one of these signal, which is used by existing receivers, is computationally intensive. In contrast, the process described in our second embodiment ensures that the code-phase of the signals arriving at the ground station receiver from the various terminals are aligned on chip timing with the signal used by the receiver to decode the received signals. Thus, an exemplary method eliminates the need for recovering the code-phase of the spreading code chips in the receiver resulting in simpler and more cost-effective receivers.

The above discussion of recovering the code phase in FIG. 6B is simplified by the fact that the symbol streams spread by the code $S_T$ all have the same value (+) and there are no symbol transitions from + to −, − to −, or − to +. Actual systems will incorporate such symbol values which are variable, and thus symbol transitions will occur. As such the correlations as the code is applied will take on values between −1 and 1, with maxima occurring at symbol start points. Also, the chips are shown as rectangular functions with no chip pulse shaping. Actual systems will likely incorporate chip pulse shaping, which will result in further variations to the correlation output values, and the peak output will now occur at the chip center.

Figure 7:
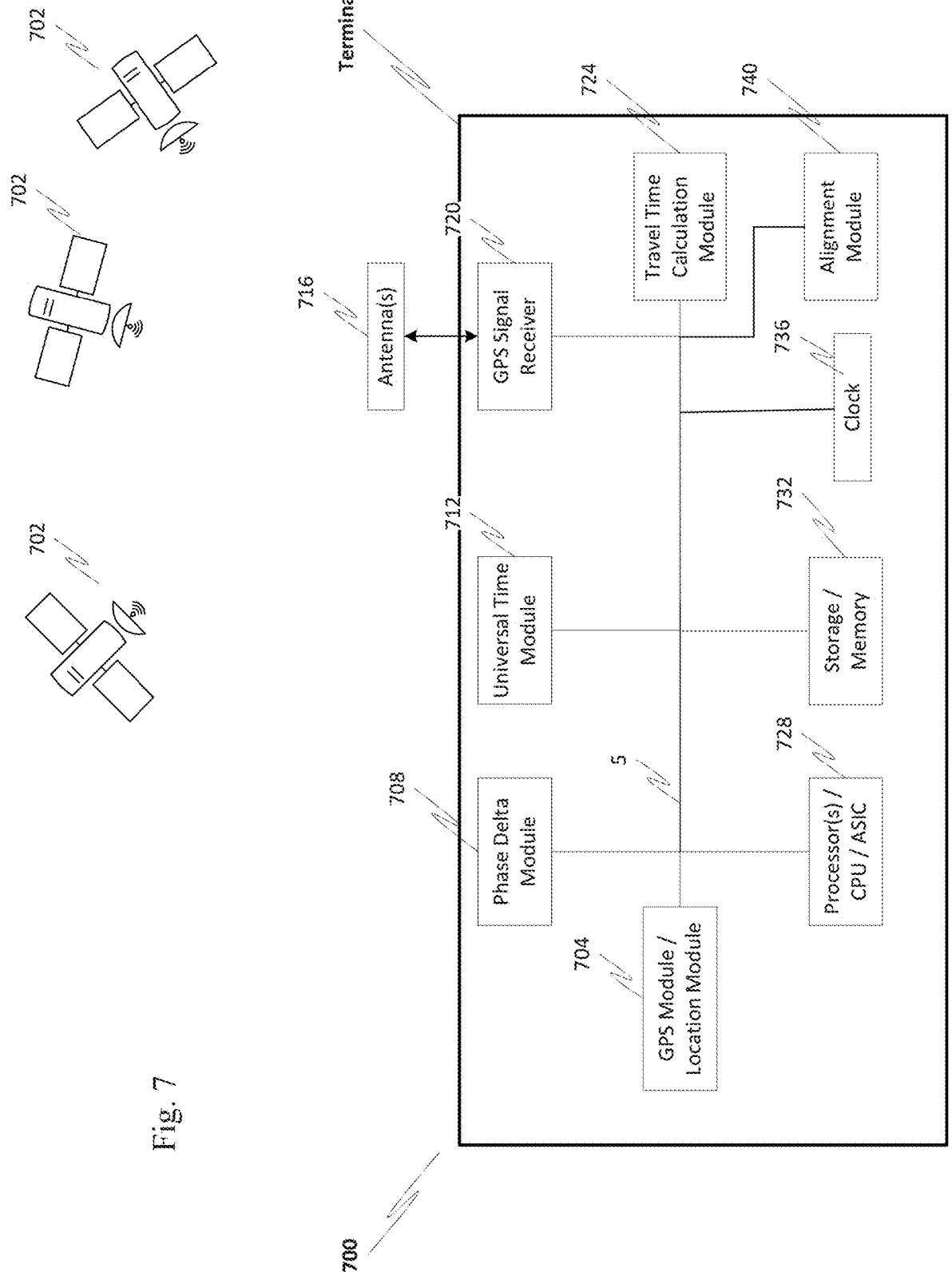
FIG. 7 illustrates an exemplary terminal architecture in accordance with some embodiments.

FIG. 7 provides a simplified block diagram 700 of a terminal, such as those illustrated in FIG. 1, however it is to be appreciated that one or more of the components in FIG. 7 could also be included in one or more of the communications satellite(s) and/or ground station(s). While not illustrated, the terminal can also optionally include one or more of a power supply (e.g., battery, solar, fuel source), navigation components (autonomous/semi-autonomous/manual), a display, a GPS receiver, a camera, communications capabilities, Wi-Fi communications capabilities and/or Bluetooth® and/or other communications capabilities.

The terminal 700 includes one or more antennas 716 associated with the GPS signal receiver 720, as well as one or more antennas used for communications. The terminal 700 further includes a GPS module/location module 704, a phase delta module 708, a universal time module 712, a travel time calculation module 724, a processor/CPU/ASIC 728, storage/memory 732 and clock 736, all interconnected by links/bus 5. This terminal receives GPS signals from GPS satellites 702.

The terminal 700 is capable of being in communication with one or more communications satellites (not shown) via conventional transmitter/receiver componentry, which is in turn in communication with one or more ground stations. Operation will be discussed in relation to the components in FIG. 7 appreciating that each separate device in a system, e.g., terminal, satellite(s), ground station(s), etc., can include one or more of the components shown in the figure, with each of the components being optional and each capable of being collocated on a single device or non-collocated and distributed over a plurality of devices. Each of the components in FIG. 7 can optionally be merged with one or more of the other components described herein, or into a new component(s). Additionally, it is to be appreciated that some of the components may have partially overlapping functionality. Similarly, all or a portion of the functionality of a component can optionally be merged with one or more of the other components described herein, or into a new component(s). Additionally, one or more of the components illustrated in FIG. 7 can be optionally implemented partially or fully in, for example, a baseband portion of a wireless communications device or GPS device such as in an analog and/or digital baseband system and/or baseband signal processor, that is typically in communication with a radio frequency (RF) system. The baseband signal processor could optionally be implemented in one or more FPGAs (Field Programmable Gate Arrays).

Furthermore, in the illustrative but non-limiting embodiment, real-world satellites may be used, such as the Galaxy 3-C satellite at 95.05° W.L., Galaxy 12 satellite at 129° W.L., and Galaxy 19 satellite at 97° W.L. Each of these three Galaxy satellites currently communicate with one of three gateway/remote control earth stations in Napa, Calif. (Call Sign E970391), and Hagerstown, Md. (Call Signs E050048 and E050049), and operate on C-band frequencies in the 3700-4200 MHz (downlink I space-to-Earth) and 5925-6425 MHz (uplink I Earth-to-space) bands. Notably, any satellites, satellite systems, communication frequencies, ground stations, etc., may be used in accordance with the techniques herein, and those illustrated herein are merely for use as an example implementation of an illustrative embodiment, and are not meant to be limiting to the scope of the present disclosure.

The one more antennas 716 can be used for wireless communications over one or more wireless links between a terminal and a satellite(s), between terminals, between a terminal and another device, and/or can also be used for reception of satellite GPS signals. The wireless communication can be in accordance with technologies such as LPWAN, multi-input multi-output (MIMO) communications, multi-user multi-input multi-output (MU-MIMO) communications, Bluetooth®, LTE, RFID, 4G, 5G, LTE, LWA, LP communications, Wi-Fi, etc. In general, the antenna(s) discussed herein can include, but are not limited to one or more of directional antennas, omnidirectional antennas, monopoles, patch antennas, loop antennas, microstrip antennas, dipoles, multi-element antennas, phased array, and any other antenna(s) suitable for communication transmission/reception. In an exemplary embodiment, transmission/reception may require a particular antenna spacing or placement on a device. In another exemplary embodiment, the type of transmission/reception can require spatial diversity allowing for different channel characteristics at each of the antennas.

Example wireless links, therefore, may specifically include, but are not limited to, radio communication links, near-field-based communication links, Wi-Fi communication links, satellite communication links, cellular communication links, infrared communication links, microwave communication links, optical communication (light/laser-based) links, combinations thereof, or the like.

The antenna(s) generally interact with an Analog Front End (AFE) (not shown), which is used to enable the correct processing of the received modulated signal and signal conditioning for a transmitted signal. The AFE can be functionally located between the antenna and a digital baseband system (not shown) in order to convert the analog signal into a digital signal for processing and vice-versa.

The CPU/controller/microprocessor 728 can be connected to the memory/storage/cache 732 and one or more of the other components discussed herein. The various components can interact with the memory/storage 732 and processor 728 which may store information and operations necessary for configuring and transmitting or receiving the information described herein and/or operating the device as described herein. The memory/storage 732 may also be used in connection with the execution of application programming or instructions by the controller/CPU 728, and for temporary or long term storage of program instructions and/or data. As examples, the memory/storage 732 may comprise a computer-readable device, RAM, ROM, DRAM, SDRAM, HD, and/or other storage device(s) and media.

The processor 728 may comprise a general purpose programmable processor or controller for executing application programming or instructions related to the device 700. Furthermore, the processor 728 can perform operations for configuring and transmitting information as described herein. The processor 728 may include multiple processor cores, and/or implement multiple virtual processors. Optionally, the processor 728 may include multiple physical processors. By way of example, the processor 728 may comprise one or more of a specially configured Application Specific Integrated Circuit (ASIC) or other integrated circuit, a digital signal processor(s), a controller, a hardwired electronic or logic circuit(s), a programmable logic device or gate array, a special purpose computer, and/or the like, to perform the functionality described herein.

The terminal 700 can further include a transmitter(s) radio circuit and receiver(s) radio circuit which can transmit and receive signals, respectively, to and from other wireless devices and/or satellites using the one or more antennas. Optionally included in the device 700 is a medium access control or MAC module/circuitry and PHY circuitry.

The MAC module can provide control for accessing the wireless medium between the devices. In an exemplary embodiment, the MAC circuitry may be arranged to contend for the wireless medium and configure frames or packets for communicating over the wireless medium as discussed.

The PHY module controls the electrical and physical specifications for communications. In particular, PHY module manages the relationship between the devices and the transmission medium. Primary functions and services performed by the physical layer, and in particular the PHY module, include the establishment and termination of a connection to a communications medium, and participation in the various process and technologies where communication resources are shared between, for example, multiple devices. These technologies further include, for example, contention resolution and flow control and modulation/demodulation or conversion between a representation of digital data and the corresponding signals transmitted over the communications channel. These signals are transmitted over a radio communications (wireless) link. The physical layer of the OSI model and the PHY module/circuitry can be embodied as a plurality of sub components. These sub components and/or circuits can include a Physical Layer Convergence Procedure (PLCP) which can act as an adaptation layer. The PLCP is at least responsible for the Clear Channel Assessment (CCA) and building packets for different physical layer technologies. The Physical Medium Dependent (PMD) layer specifies modulation and coding techniques used by the device and a PHY management layer manages channel tuning and the like. A station management sub layer and the MAC circuitry can also handle coordination of interactions between the MAC and PHY layers at the various transceivers.

The MAC layer and components, and in particular the MAC circuitry can provide functional and procedural means to transfer data between the entities and to detect and possibly correct errors that may occur in the physical layer. The MAC circuitry also can provide access to contention-based and contention-free traffic on different types of physical layers, such as when multiple communications technologies are incorporated into one or more of the devices. In the MAC, the responsibilities are divided into the MAC sub-layer and the MAC management sub-layer. The MAC sub-layer defines access mechanisms and packet formats while the MAC management sub-layer defines power management, security and roaming services, etc.

The terminal 700 can also optionally contain a security module (not shown). This security module can contain information regarding but not limited to, security parameters required to connect the terminal to one or more other devices or other available network(s), and can include WEP or WPA/WPA-2 (optionally+AES and/or TKIP) security access keys, network keys, etc. Security access keys are a security password used by networks. Knowledge of this code can enable a wireless device to exchange information with another device.

The terminal can also optionally contain an interleaver/deinterleaver that can perform interleaving and/or deinterleaving functions to, for example, assist with error correction. A modulator/demodulator can optionally perform modulation and/or demodulation functions such as OFDM, QPSK, QAM, or other modulation/demodulation techniques, etc. An encoder/decoder can optionally perform various types of encoding/decoding of data. A scrambler can optionally be used for data encoding. A multiplexer/demultiplexer can optionally provide multiplexing and demultiplexing services, such as spatial multiplexing.

In operation, the GPS signal receivers 720 in the terminals T1 and T2 receive GPS signals from at least three GPS satellites, and infer from the signals precise universal time in cooperation with the universal time module 712.

Specifically, each terminal acquires at least three GPS satellites, noting that the satellites do not need to be the same for the terminals (T1, T2) and the terminals can acquire and use different or overlapping satellites. The phase delta module 708 determines the phase difference between the GPS signals from the different GPS satellites that were acquired, and based on this difference, determines in cooperation with the GPS module/location module 704 the location of the terminal.

The location module 704 also determines the terminal's distance from each one of the acquired GPS satellites. This distance is used by the travel time calculation module 724 to calculate the travel time of the signal from each acquired GPS satellite to the terminal. Specifically, the travel time calculation module 724 uses the speed of light to convert the distance to a time delay. This delay is then corrected for the ionospheric delay using a model provided in a navigation message, for the "Sagnac" effect (the result of transmission in a rotating inertial reference system), and for hardware delays in cables and receiver circuitry. The resulting delay time is used by the processor 728 to align and synchronize the internal clock 736 of the terminal with the universal time.

As discussed, this alignment of the internal clock can be accomplished by adjusting the received universal time from a satellite by the respective travel time of the signal from a GPS satellite. The universal time can be determined from any of the GPS satellites an in an optional embodiment, the travel time calculation module 724 can determine the travel time with respect to multiple satellites and average or otherwise update the resultant calculation so as to minimize any timing error that may exist in the timing obtained from any single satellite. This averaged result can then be used to update the internal clock 736.

While the above process provides common timing for all terminals, the terminals also need to align the code-phase of the transmitted signals from each terminal.

As illustrated herein in relation to FIG. 3, communications satellite CS1 and ground station G1 are used to facilitate communications between terminals T1 and T2. The code-phase arriving at the ground station G1 from terminal T1 depends on the distance in Eq. 6. Similarly, the code-phase of the signal arriving at the ground station from terminal T2 depends on the distance described in Eq. 7. The difference between the code-phases of these two signals is relative to the difference in their respective travel times and can be calculated by Eq. 8.

The location of the communications satellite CS1 is known by the location module 704. For geostationary (GEO) satellites, the location in space relative to earth coordinates is fixed. For any other satellites (e.g., low-earth orbit or non-stationary geosynchronous satellites), the precise location relative to the earth varies with time but can be determined at any time by the location module 704. Once the location of a terminal is determined via GPS by the GPS module 704, the distance between the communications satellite and the terminal can be calculated.

In accordance with one exemplary embodiment, the terminals are configured to align the code-phase of the arriving signals at the communications satellite to coincide with a tick time. This is accomplished with the terminal 700 determining with the GPS module 704 its GPS location. The processor 728 then selects a communications satellite and determines the position of this satellite in space with the cooperation of the location module 704. With this information, the distance between the terminal and the communications satellite is determined. The alignment module 740 determines the alignment delay to ensure that the code-phase of the received signal at the communications satellite is aligned with a specific timing tick. To achieve this, the travel time of the signal from the terminal to the communications satellite is calculated using the propagation speed of radio waves through the layers of the atmosphere. The time is divided modulo the boundary clock tick time, and the result is the alignment time as illustrated in Eq. 9.

The terminal is then able to align the code-phase used for the terminal transmission by the processor 728 controlling the delay of the start of a transmission by the alignment time delay of Eq. (9) with respect to the universal clock ticks.

By synchronizing the code phase of the arriving signals from the various terminals at the communications satellite, the code phases of the arriving signals at the ground station receiver are also aligned on the chip boundary and, as a result, the starting time as seen by the ground station receiver of the spreading codes used by the various terminals to spread the transmitted frequencies start substantially on the same chip timing.

As discussed, the ground station can also synchronize its internal timer (clock) with the universal time from the GPS satellites by obtaining the GPS time and compensating for the delay between the GPS satellite(s) and the ground station. This is done so that the code phase (timing) of any received message can only occur at integer chip offsets of a universal tick. In this way, the chip timing may be implied instead of estimated at the receiver. Here, the terminals should take into account the distance $d_{GS}$ between the communications satellite and the ground station. This is accomplished by a GPS module in the ground station determining the GPS location of the ground station using GPS satellites. Those skilled in the art should understand that the precise location of the ground station may be obtained from GPS components, from triangulation of cell phone towers, triangulation to TV stations, entered manually as a configuration parameter or by any other method(s). The specifics of how the ground station obtains its precise location is not fundamental to the technology disclosed herein. The terminal 700 determines the communications satellite used for communication with the ground station and also determines the position of this satellite in space with the cooperation of the location module 704. The distance between the terminal and the communications satellite is calculated by the processor 728 and the terminal adds this distance to the distance between the communications satellite and the ground station and determines the total distance the radio signal from the terminal needs to travel towards the ground station with optionally cable and other receiver delays being factored into the calculation.

The alignment module 740 determines the alignment delay to ensure that the code-phase of the received signal at the ground station receiver G1 is aligned with a specific timing clock tick. To achieve this, the total travel time of the signal from the terminal to the ground station is calculated using the speed of propagation is determined by the processor 728. The travel time is divided modulo the boundary clock tick time, and the result is the alignment time illustrated in Eq. 10.

The code-phase used for the terminal transmission is aligned by the processor 728 delaying the transmission spreading code by the alignment time delay of Eq. (10) with respect to the universal clock ticks. Therefore, since the code phase of the arriving signal at the ground station is known, the ground station does not need to estimate or otherwise to recover it from the received signal. Rather, the ground station can de-spread the received signal using a spreading code aligned with the time tick as explained above. Although not specifically described, those skilled in the art should recognize that the timing delay is also compensated for various system delays such as the relaying delay of the communication satellite CS1, cable and analog front end amplifier delays, etc.

It should be noted that certain steps within the flowcharts may be optional and the steps shown in the figures are merely examples for illustration, and certain other steps may be included or excluded as desired. Furthermore, while a particular order of the steps is shown, this ordering is merely illustrative, and any suitable arrangement of the steps may be utilized without departing from the scope of the embodiments herein. Moreover, the methods are described separately, certain steps from each procedure may be incorporated into one or more of the other methods, and the various steps are not meant to be mutually exclusive.

In the detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems— Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing or future developed cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols or other communications protocols, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), LPWAN, LoRA, Ultra Narrow Band, Random Phase Multiple Access, or the like. Other embodiments may be used in various other devices, systems and/or networks.

Some demonstrative embodiments may be used in conjunction with a WLAN (Wireless Local Area Network), e.g., a Wi-Fi network. Other embodiments may be used in conjunction with any other suitable wireless communication network, for example, a wireless area network, a "piconet", a WPAN, a WVAN, and the like.

Some demonstrative embodiments may be used in conjunction with a wireless communication network communicating over a frequency band of 5 GHz and/or 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, the technology may be useful in the unlicensed spectrum.

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments will be described in relation to communications systems, as well as protocols, techniques, means and methods for performing communications, such as in a wireless network, or in general in any communications network operating using any communications protocol(s). It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or satellite communications system(s) described herein.

Thus, it should be appreciated that the components of the system can be combined into one or more devices, or split between devices, such as a transceiver, a device, an IoT sensor, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a spatial router, a node on the network, a domain management device, a network operation or management device, a transceiver(s), a station, an access point(s), a communications unit, or some combination thereof. Similarly, one or more of the functional portions of the system could be distributed between a transceiver and an associated computing device/system.

Furthermore, it should be appreciated that the various links 5, including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The exemplary embodiments are described in relation to LPWAN communications. However, it should be appreciated, that in general, portions of the systems and methods herein will work equally well for any type of communication system in any environment utilizing any one or more protocols including wired communications, wireless communications, powerline communications, coaxial cable communications, fiber optic communications, and the like.

To avoid unnecessarily obscuring the present disclosure, the description omits well-known structures and devices that may be shown in block diagram form or otherwise summarized.

Exemplary aspects are directed toward:

A communications system comprising:
- a location determining module adapted to determine a location of one or more of the terminal and a communications satellite; and
- an alignment module, the alignment module at least using location information from the location determining module to align arrival code-phases of signals for a ground station receiver.

Any of the aspects, wherein the alignment module:
determines an alignment time and aligns a code-phase of a spread code on a clock tick boundary.

Any of the aspects, wherein the determining of the alignment time includes:
determining a geographic position of the terminal;
determining a position of the communications satellite;
determining a distance between the terminal and the communications satellite; and
adjusting a starting time of a spreading code by a function of a communications signal travel distance modulo predetermined time period.

Any of the aspects, wherein the adjusting comprises subtracting a time the communications signal travels along a distance modulo predetermined time period from a predetermined time period.

Any of the aspects, wherein the determining of the alignment time includes:
determining a geographic position of the terminal;
determining a position of the communications satellite;
determining a distance between the terminal and the communications satellite; and
adjusting a starting time of a spreading code by a function of a distance the communications signal travels from the terminal to the communications satellite modulo predetermined time period.

Any of the aspects, wherein the determining of the alignment time includes:
determining a geographic position of the terminal;
determining a geographic position of the ground station;
determining a position of the communications satellite;
determining a distance between the terminal and the communications satellite;
determining a distance between a ground station and the communications satellite;

establishing a total distance a signal traverses by adding the distance between the terminal and the communications satellite and the distance between the ground station and the communications satellite; and adjusting a starting time of a spreading code by a function of a communications signal travel distance modulo predetermined time period.

Any of the aspects, wherein the adjusting comprises subtracting a time the communications signal travels along the distance modulo predetermined time period from the predetermined time period.

Any of the aspects, further comprising a ground station alignment module adapted to align code-phase timing of a spreading code used by a receiver to de-spread a received signal with a specific time period clock ticks aligned with a universal GPS clock timing.

Any of the aspects, further comprising a phase delta module, a universal time module, a clock and a travel time calculation module in communication with the location determining module.

A communications method for a communications terminal comprising:

determining a location of one or more of the terminal and a communications satellite; and using location information to align arrival code-phases of signals at a ground station receiver.

Any of the aspects, further comprising determining an alignment time and aligning a code-phase of a spread code on a clock tick boundary.

Any of the aspects, wherein the determining of the alignment time includes:

determining a geographic position of the terminal;
determining a position of the communications satellite;
determining a distance between the terminal and the communications satellite; and adjusting a starting time of a spreading code by a function of a communications signal travel distance modulo predetermined time period.

Any of the aspects, wherein the adjusting comprises subtracting a time the communications signal travels along a distance modulo predetermined time period from a predetermined time period.

Any of the aspects, wherein the determining of the alignment time includes:

determining a geographic position of the terminal;
determining a position of the communications satellite;
determining a distance between the terminal and the communications satellite; and adjusting a starting time of a spreading code by a function of a distance the communications signal travels from the terminal to the communications satellite modulo predetermined time period.

Any of the aspects, wherein the determining of the alignment time includes:

determining a geographic position of the terminal;
determining a geographic position of the ground station;
determining a position of the communications satellite;
determining a distance between the terminal and the communications satellite;
determining a distance between a ground station and the communications satellite;
establishing a total distance a signal traverses by adding the distance between the terminal and the communications satellite and the distance between the ground station and the communications satellite; and adjusting a starting time of a spreading code by a function of a communications signal travel distance modulo predetermined time period.

Any of the aspects, wherein the adjusting comprises subtracting a time the communications signal travels along the distance modulo predetermined time period from the predetermined time period.

Any of the aspects, further comprising aligning code-phase timing of a spreading code used by a receiver to de-spread a received signal with a specific time period clock ticks aligned with a universal GPS clock timing.

Any of the aspects, further comprising updating an internal clock and determining a universal time.

A communications system comprising:

means for determining a location of one or more of the terminal and a communications satellite; and means for using location information to align arrival code-phases of signals at a ground station receiver.

Any of the aspects, further comprising means for determining an alignment time and means for aligning a code-phase of a spread code on a clock tick boundary.

Any of the aspects, wherein the determining of the alignment time includes:

determining a geographic position of the terminal;
determining a position of the communications satellite;
determining a distance between the terminal and the communications satellite; and adjusting a starting time of a spreading code by a function of a communications signal travel distance modulo predetermined time period.

Any of the aspects, wherein the adjusting comprises subtracting a time the communications signal travels along a distance modulo predetermined time period from a predetermined time period.

Any of the aspects, wherein the determining of the alignment time includes:

determining a geographic position of the terminal;
determining a position of the communications satellite;
determining a distance between the terminal and the communications satellite; and adjusting a starting time of a spreading code by a function of a distance the communications signal travels from the terminal to the communications satellite modulo predetermined time period.

Any of the aspects, wherein the determining of the alignment time includes:

determining a geographic position of the terminal;
determining a geographic position of the ground station;
determining a position of the communications satellite;
determining a distance between the terminal and the communications satellite;
determining a distance between a ground station and the communications satellite;
establishing a total distance a signal traverses by adding the distance between the terminal and the communications satellite and the distance between the ground station and the communications satellite; and adjusting a starting time of a spreading code by a function of a communications signal travel distance modulo predetermined time period.

Any of the aspects, wherein the adjusting comprises subtracting a time the communications signal travels along the distance modulo predetermined time period from the predetermined time period.

Any of the aspects, further comprising means for aligning code-phase timing of a spreading code used by a receiver to de-spread a received signal with a specific time period clock ticks aligned with a universal GPS clock timing.

Any of the aspects, further comprising means for updating an internal clock.

A communications system comprising:

an alignment module, processor and connected memory that at least using location information for one or more of a terminal and a communications satellite to align modulation and demodulation codes, or spreading and de-spreading codes, for a ground station receiver.

Any of the aspects, wherein the alignment module is in one or more of a terminal and a ground station.

Any of the aspects, wherein the terminal aligns a code-phase of an arriving signal at the communications satellite to coincide with a specific moment in time.

Any of the aspects, wherein the communications satellite aligns a code-phase of a de-spreading signal at a ground station to coincide with a specific moment in time.

A system on a chip (SoC) including any one or more of the above aspects.

One or more means for performing any one or more of the above aspects.

Any one or more of the aspects as substantially described herein.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as a spatial router, or collocated on a particular node/element(s) of a distributed network, such as a communications network. As will be appreciated from the following description, and for reasons of computational efficiency, the components of the system can be arranged at any location within a distributed network without affecting the operation of the system. For example, the various components can be located in a transceiver, a spatial router, a station, a sensor, a management device, or some combination thereof. Similarly, one or more functional portions of the system could be distributed between a transceiver and an associated computing device.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for communication. Additionally, the exemplary techniques illustrated herein are not limited to the specifically illustrated embodiments but can also be utilized with the other exemplary embodiments and each described feature is individually and separately claimable.

The above-described system can be implemented or partially implemented on a wireless telecommunications device(s)/system, such an IEEE 802.11 transceiver, a satellite communications transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, 3GPP, Wireless LAN, WiMAX, DensiFi SIG, Unifi SIG, 3GPP LAA (licensed-assisted access), and the like.

The term transceiver/terminal as used herein can refer to any device that comprises hardware, software, circuitry, firmware, or any combination thereof and is capable of performing any of the methods, techniques and/or algorithms described herein.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has at least been provided systems and methods for enhancing and improving communications. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A communications system comprising:
a location determining module and connected GPS receiver that identify a location of one or more of a terminal and a geostationary communications satellite; and
an alignment module, the alignment module at least in communication with and at least using information corresponding to the determined location from the location determining module to align arrival code-phases of signals, relayed through a communication satellite, for a ground station receiver by altering a clock for a modulated signal transmitted from the terminal.

2. The system of claim 1, wherein the alignment module: determines an alignment time and aligns a code-phase of a spreading code on a clock tick boundary.

3. The system of claim 1, wherein the system adjusts a starting time of a spreading code by a function of a communications signal travel distance modulo predetermined time period, wherein the adjusting comprises subtracting a time the communications signal travels along a distance modulo predetermined time period from a predetermined time period.

4. The system of claim 2, wherein the determining of the alignment time includes:
determining a geographic position of the terminal;
determining a position of the communications satellite;
determining a distance between the terminal and the communications satellite; and
adjusting a starting time of the spreading code by a function of a distance the communications signal travels from the terminal to the communications satellite modulo predetermined time period.

5. The system of claim 2, wherein the determining of the alignment time includes:
determining a geographic position of the terminal;
determining a geographic position of the ground station;
determining a position of the communications satellite;
determining a distance between the terminal and the communications satellite;
determining a distance between a ground station and the communications satellite;
establishing a total distance a signal traverses by adding the distance between the terminal and the communications satellite and the distance between the ground station and the communications satellite; and
adjusting a starting time of the spreading code by a function of a communications signal travel distance modulo predetermined time period.

6. The system of claim 5, wherein the adjusting comprises subtracting a time the communications signal travels along the distance modulo predetermined time period from the predetermined time period.

7. The system of claim 1, further comprising a ground station alignment module adapted to align code-phase timing of a spreading code used by a receiver to de-spread a received signal with a specific time period clock ticks aligned with a universal GPS clock timing.

8. The system of claim 1, further comprising a phase delta module, a universal time module, a clock and a travel time calculation module in communication with the location determining module.

9. A communications method for a communications terminal comprising:
determining a location of one or more of the communications terminal and a geostationary communications satellite;
using information corresponding to the determined location to align arrival code-phases of signals at a ground station receiver; and
determining an alignment time and aligning a code-phase of a spreading code on a clock tick boundary for a signal transmitted from the terminal.

10. The method of claim 9, further comprising adjusting a starting time of a spreading code by a function of a communications signal travel distance modulo predetermined time period, wherein the adjusting comprises subtracting a time the communications signal travels along a distance modulo predetermined time period from a predetermined time period.

11. The method of claim 9, further comprising adjusting a starting time of a spreading code by a function of a distance the communications signal travels from the terminal to the communications satellite modulo predetermined time period, wherein the adjusting comprises subtracting a time the communications signal travels along the distance modulo predetermined time period from the predetermined time period.

12. The method of claim 9, further comprising aligning code-phase timing of the spreading code used by a receiver to de-spread a received signal with a specific time period clock ticks aligned with a universal GPS clock timing and updating an internal clock and determining a universal time.

13. A communications system comprising:
an alignment module, a processor and connected memory that at least use location information for a terminal, a ground station, and a geostationary communications satellite to align modulation and demodulation codes, or spreading and de-spreading codes, for a signal transmitted from the terminal to the ground station receiver via the geostationary communications satellite; and
Wherein a code-phase of the spreading code is aligned on clock tick boundary.

14. The system of claim 13, wherein the alignment module is in one or more of the terminal and the ground station.

15. The system of claim 14, wherein the terminal aligns a code-phase of an arriving signal at the communications satellite to coincide with a specific moment in time.

16. The system of claim 14, wherein the terminal aligns a code-phase of a de-spreading signal at a ground station to coincide with a specific moment in time.

* * * * *